F. BRACKETT.
APPARATUS FOR TESTING FLYING MACHINES.
APPLICATION FILED SEPT. 14, 1909.
1,032,651.
Patented July 16, 1912.
2 SHEETS—SHEET 1.
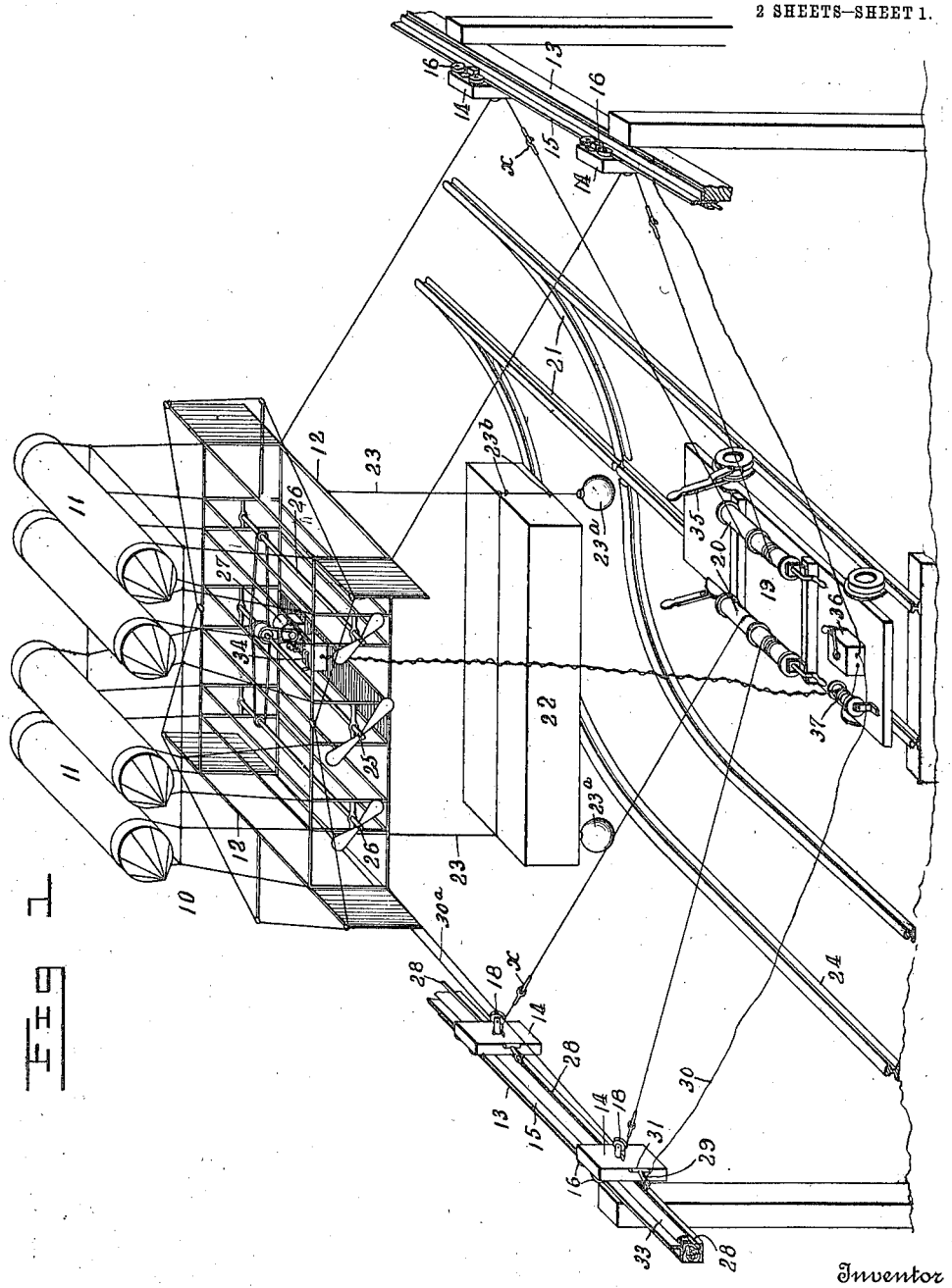
Witnesses
H. A. Robinette
E. H. Bickerton
Inventor
Frederick Brackett
By Meyers, Cushman & Rea
Attorney F. BRACKETT.
APPARATUS FOR TESTING FLYING MACHINES.
APPLICATION FILED SEPT. 14, 1909.
1,032,651.
Patented July 16, 1912.
2 SHEETS—SHEET 2.
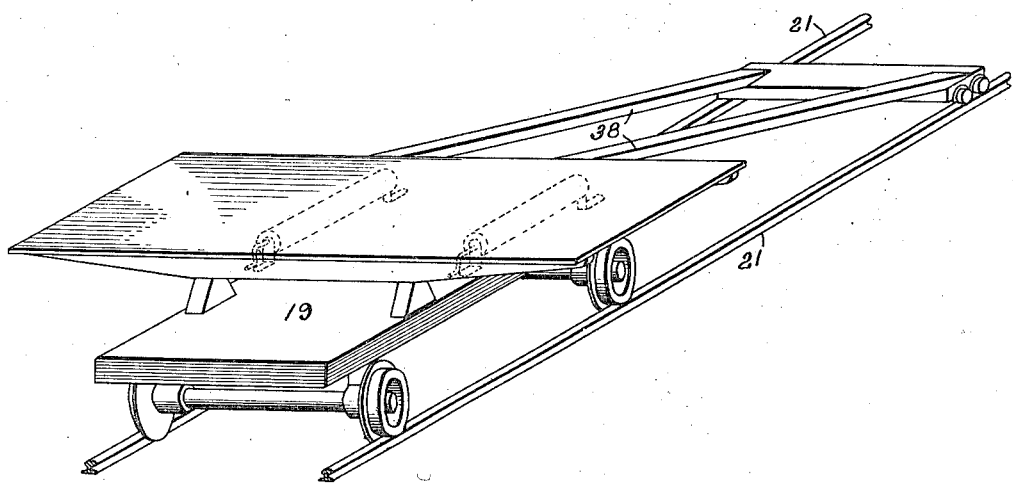
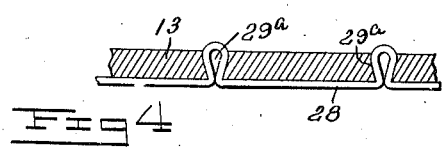
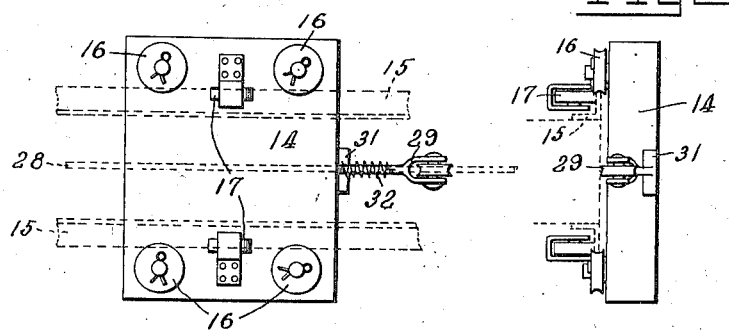
Inventor
Frederick Brackett
Witnesses

UNITED STATES PATENT OFFICE.

FREDERICK BRACKETT, OF WASHINGTON, DISTRICT OF COLUMBIA.

APPARATUS FOR TESTING FLYING-MACHINES.

1,032,651.  Specification of Letters Patent.  Patented July 16, 1912.

Application filed September 14, 1909. Serial No. 517,583.

*To all whom it may concern:*

Be it known that I, FREDERICK BRACKETT, a citizen of the United States, residing at Washington, in the District of Columbia, have invented new and useful Improvements in Apparatus for Testing Flying-Machines, of which the following is a specification.

My invention relates to an apparatus particularly adapted for testing heavier than air machines, such for instance as what are now commonly known as mono-planes and bi-planes. While it is particularly adapted for this use it may be used for testing air craft of any known type whether heavier than air or lighter than air.

In testing heavier than air machines great difficulty is now experienced in that the machines cannot be at once adjusted properly, and machines in the experimental stage often require marked changes in proportion of parts and design generally before they will fly successfully. The result is that when they are making their trial flights much damage is caused due to the freaks of the trial machine, and in many instances lives are lost during the trial. Not only is this true, but the trial flights as ordinarily conducted with the machine operating freely and independently of any support other than that given by its own power, observations are difficult to make as the operator has to give the major part of his attention to the guiding of the machine in such a manner as to save the machine and himself in case all should not go well. When the machine does not go well the operator is then in danger of his life and has still less time to notice the cause of the trouble and has no time in which to consider a remedy for it until the machine has landed and its flight is at an end. At this time of course he observes the machine in static condition and is hindered in arriving at proper conclusions and promptly remedying the trouble owing to the fact that that point which should be most clear in his consideration, *i. e.* the behavior of the machine in flight, is instead of being most clear quite hazy and indistinct. It is only after repeated trials of this nature that air craft can be made to fly at all, and their perfection is many times a matter of surmise. If the operator or inventor could have a reasonable time for observing the behavior of the machine in flight all this difficulty would be minimized, and the success of his machine would be hastened, and the long drawn out time of delay and danger avoided.

It is the object of my invention to produce an apparatus by the use of which the desired observation of the behavior of the trial machine may be had, and this without danger to the experimenter. With this object in view I have designed an apparatus which fulfils many of the requirements of an apparatus of this kind, and which is possessed of many advantages which especially adapt it for use in the testing of trial machines. By its use the behavior of the trial craft can be noticed under many conditions and for any length of time without danger to the operator on the trial craft.

All the various elements which form part of my apparatus and their connection and coöperation with each other will be fully explained in the following specification taken in connection with the accompanying drawings, in which—

Figure 1 is a perspective view showing my apparatus in operation. Fig. 2 is a modified form of a controlling car constituting one of the elements of my apparatus, and used in controlling flight of tester if needed, and in moving experimental craft into position for attachment to the tester. Fig. 3 is a rear elevation of a traveling pulley block which I make use of in the control of a captive air craft which constitutes another element of my apparatus. Fig. 4 is a sectional view showing a convenient means of attaching the trolleys to the supporting rails. Fig. 5 is an end view of the traveling pulley block shown in Fig. 3.

My apparatus consists in the main of three coöperating elements, namely, a captive air craft, a pair of spaced guide rails supporting traveling blocks to which the air craft is guyed by suitable cables, and a controlling car to be used if desired which is provided with means for controlling the air craft and to which the cables guying the air craft are secured in the beginning of the trial after passing through the traveling blocks. The guide rails are spaced apart some distance, such as fifty or sixty feet, and preferably form a closed track, such as an elliptical, oval or circular course. The captive air craft I prefer to make a lighter than air machine equipped to be propelled by its own power. I then operate the trial craft at will, propelling the captive craft abreast of the trial craft around the course. In this way the trial craft may be operated under all sorts of conditions and at any speed desired without interference from the captive supporting craft, and at the same time all danger both to the trial craft and its operator may be avoided.

In Fig. 1, 10 is the captive craft. As shown it is of the lighter than air type, its buoyancy being supplied by four gas bags or containers 11 which support a rectangular car 12 by the usual guy wires and braces. These gas bags are preferably elongated in shape and placed in pairs spaced apart in such a manner as to apply their support to different parts of the car 12, and thus greatly increase the stability of the captive craft. It is, of course, evident that I may space all four gas containers equidistant apart, their support being given to the car 12 at four points or along four lines equdistant from each other. My idea is to distribute the buoyant force in such a manner that the craft will be most stable and most steady under varying conditions.

13, 13 are the two supporting and guiding rails of the closed guiding track.

14 are traveling blocks which are supported from and travel on the supporting rails 13. Metallic guide rails 15 on the top and bottom respectively of the supporting rails 13 are engaged by rollers 16 and 17 on the traveling blocks. In the form illustrated there are four of the rollers 16 in a vertical plane, two running on the top rail 15, and two on the bottom rail, while there are two of the rollers 17 on each block in a horizontal plane and located behind the rails 15. In this manner the traveling blocks are confined to the guide rails. Preferably I employ four of the traveling blocks 14, two of them on each guiding rail 15. Each block is provided with a swiveled and hinged pulley or sheave 18 on its inner side, and over these pulleys run guy ropes or cables, two to each side of the captive craft. By thus using four guy ropes or cables I further increase the steadiness and stability of my captive craft. Especially is this true in view of the fact that the guide rails 13 are spaced apart quite widely, and in view of the fact that the traveling blocks 14 may be spaced apart on them as desired. The cables in outline form a pyramidal structure, and as is well known when force is applied along such lines great stability results.

19 is a controlling car which carries a pair of windlasses 20 to which the guy ropes or cables after passing over the sheaves 18 and the auxiliary cables are made fast, the slack in the cables being taken up on the windlass drums.

21 is a track of usual construction laid midway between the guide rails 13 and on which the car 19 is adapted to travel.

The numeral 22 designates the trial craft which is suspended from the captive craft by cables 23, preferably one on each side of the craft. These cables 23 carry weights 23$^a$ on their lower ends for the purpose of keeping the cables or ropes relatively taut, so that there will be no danger of the propellers and other movable parts of the respective air crafts being caught in the cables, or of the cables becoming tangled with other parts of the apparatus when the trial craft rises. The trial craft 22 is equipped with two or more rings 23$^b$ on each side through which the cables 23 loosely pass, and by which the trial craft is allowed to rise and fall during its flight, and is at the same time confined within the limits of the cables 23. The range of movement of the trial craft is thus extended in a vertical direction as well as a horizontal direction.

As thus constructed the use of my apparatus is as follows: The apparatus for testing the trial craft 22 is raised into position at a desired height by the use of the lighter than air craft described, and is held at such height or brought to the ground by cables 30, and the auxiliary cables 30$^a$ in connection with surface car. The cables 30$^a$ are connected to the main cables 30 by separable connectors $x$ admitting of the detachment of the cables 30$^a$ when it is desired that the tester shall be used without the controlling car during the testing of the trial craft. The trial air craft is brought out on a car running on the side tracks 24, the car being run onto the main track, the craft is secured to the cables 23, which may be made in suitable length, a windlass being provided in the car of the captive power craft for this purpose if desired. During this operation the captive craft is brought quite low, but after the trial craft has been secured to the supporting cables 23 the captive craft is allowed to rise, the guy cables being let out by means of the windlasses 20. As the captive craft rises it lifts the tral craft with it, and it is allowed to rise until the trial craft is the desired distance from the ground. Twenty-five feet is amply sufficient for all practical purposes. This done the trial craft may be manipulated as desired, following the course defined by the supporting rails 13, which are the guiding rails and, as said, form a closed course.

During the manipulation of the trial air craft I prefer to have the captive air craft kept abreast of it instead of being drawn along the course by the trial craft, as there is thus given more freedom to the trial craft. To this end I make the captive craft a power craft, thus enabling it to propel itself. An admirable power for this purpose is electric power. I equip my captive craft with three driving shafts, a main shaft 25 located centrally of the machine and driving a large propeller, and two auxiliary shafts 26 located one on each side of the main shaft, and driving propellers of smaller size.

27 is an electric motor which drives all the shafts. This electric motor I supply with power from a pair of trolley wires 28, one secured to each supporting rail 13. In Fig. 4 I show a convenient means of attaching these trolley wires 28 to the supporting rails. Holes 29$^a$ are bored at intervals in the rail, and the trolley wire 28 is looped at points opposite these holes, the loops being forced into the holes which are beveled on the opposite sides of the rails, the natural enlargement of the loop at the bend preventing the loop from being drawn out of the hole with ease, and firmly holding the trolley wire against the supporting rail. These trolley-wires 28 are supplied with power from any suitable source, and power is transmitted by them to the motor on the tester car through trolley wheels 29 mounted on the traveling blocks 14 and cables 30 which lead from them to the motor. The trolleys 29 are pivoted at 31 on the blocks as shown, being pressed by spring 32 into engagement with the trolley wire 28. A guard rail 33 overhangs the trolley wire 28 and serves to guard against accidental contact of the guy cables with the trolley as well as to prevent its engagement by other objects or persons, and avoid damage and accident. On the car 12 of the captive craft I provide an electric controller 34 in the motor circuit for controlling the speed of the motor, and hence the speed of the craft. An operator in the car may, therefore, easily keep abreast of the trial craft. In addition to this control four rudders, one at each corner of the craft are provided to assist in turning on the curves of the course, and thus preventing a surging of the craft from one side to the other as the case may be, and thus disturbing the trial craft.

Instead of placing all the control in the hands of an operator on the captive craft, I may arrange for control from the ground. In such case if anything happened to the operator on the power craft, or if he should lose control of the craft, a person could control the same from the ground without interrupting the trial of the experimental machine. That this may be accomplished I provide on the car 19, which I call a controlling car, a mechanical friction brake 35 which may be operated to retard or stop the power craft by retarding or stopping the controlling car to which the guy ropes are secured. I also mount on this car an additional electrical controller 36, and loop the power cable 30 from the block 14 to a windlass 37 from which it passes to the motor 27 on the power craft. The speed of the motor and of the captive craft may thus be controlled directly from the controlling car.

After the tests are through the captive craft is lowered until the trial craft is near the ground, when the side track car for supporting the trial craft is run out on the main track and the trial craft lowered upon it, after which it may be taken to its storage. The captive craft may then be brought down to the ground or not as desired. Preferably I provide on the controlling car a frame for supporting the captive craft after it has been brought to the ground, and extending from one end of this frame are a pair of skids 38 whose ends terminate in rollers resting on the track rails 21. The captive craft may thus be easily loaded onto the controlling car and moved to a place of storage, when it is desired to put it away for a season. In lowering the captive craft the gas containers may be opened to release enough gas to allow the craft to settle gently to the ground. See Fig. 2.

The apparatus which I have designed possesses several great advantages when used in testing trial crafts. In the first place the trial craft has a wide range of movement. The guide rails are some distance apart, and thus the trial craft has considerable latitude of movement. Within this latitude it may be moved around the entire course as many times as desired. In the second place the support which it has is quite stable, the broad captive craft with its distributed buoyancy and its special arrangement of guy ropes or cables being very steady. In the third place, the trial craft may be manipulated throughout the course with greatest freedom, as the captive craft which supports it instead of having to be dragged by it, keeps abreast of it, this allowing it a degree of freedom limited only by the length of the supporting cables. In the fourth place, the entire apparatus is controlled most easily, and its position, speed and the height at which it carries the trial craft may be varied at will. Possessing these advantages the apparatus fulfils the object of the invention.

While I have described the best form of my invention now known to me, it is of course obvious that many modifications may be made in the form of the elements which go to make it up and their specific arrangement with relation to each other without in any way departing from the spirit of the invention. Such changes will naturally have to be made when my device is modified to adapt it to different conditions, so that it may be used with different machines. Also my apparatus may be used for a purpose other than that of testing trial craft, such for instance as the carrying of passengers in the captive craft, the passengers being taken around the course for pleasure. It may well find such use as an amusement device for use in parks. I desire to cover all such modifications and uses in the annexed claims.

What I claim is,—

1. An apparatus of the character described, comprising a pair of rails spaced apart, a captive air craft movably guyed to both rails by cables directly from the craft, means for propelling said craft, and means for suspending a trial craft therefrom.

2. An apparatus of the character described, comprising a pair of rails spaced apart, a captive air craft, a guy from the air craft to each rail movable along the rail, and means for suspending a trial craft therefrom.

3. An apparatus of the character described, comprising a captive air craft equipped with two or more gas containers, and means for suspending a trial air craft beneath the same, a track having rails relatively widely spaced apart, and guy ropes extending from the respective sides of said craft to the respective rails.

4. An apparatus for testing air craft comprising a plurality of gas bags secured to a common frame structure means for supporting a trial craft beneath said frame structure, a pair of rails fixedly secured to the earth and relatively widely spaced apart, and guy ropes connecting said air craft to said rails.

5. An apparatus for the testing of heavier than air crafts comprising a movable captive air craft of the lighter than air type means confining the craft to a given course, weighted means for suspending a trial craft beneath the same, and means for controlling the height of said captive craft.

6. An apparatus for the testing of heavier than air crafts comprising a movable captive air craft of the lighter than air type means confining the craft to a given course, means for suspending a trial craft beneath the same, and means for controlling the height of said trial craft.

7. In an apparatus of the character described, a pair of guide rails spaced apart, an air craft, whose buoyancy is relatively widely distributed, a guy cable from the craft to each rail, and means for freely supporting a trial craft from said air craft of relatively widely distributed buoyancy, said means allowing free movement of the trial craft in all planes.

8. An apparatus of the character described, comprising a pair of elevated supporting rails spaced apart, traveling blocks mounted on said rails, an air craft, guys from said craft running to said traveling blocks, and means for supporting a trial craft from and beneath said captive craft.

9. An apparatus of the character described, comprising two rigid supporting rails, traveling blocks on said rails, an air craft, cables running from said air craft to said blocks, an electric motor on the craft for propelling the same, a trolley wire supported by one of said rails, a trolley mounted on a traveling block, a power cable connecting the trolley with the motor, and means for supporting a trial craft from and beneath said captive craft.

10. In an apparatus of the character described, a guide rail, a traveling block on said guide rail, an air craft guyed to said block by a cable, an electric motor on said craft for propelling the same, a trolley wire supported by said guide rail for supplying power to said motor, a guard over said trolley wire for preventing contact of said guy cable therewith, and means for supporting a trial craft from and beneath said captive craft.

11. An apparatus of the character described comprising guide rails spaced apart, traveling blocks on said guide rails, a power air craft, cables running from said craft to said blocks, an electric motor on said air craft, a trolley wire supported by one of said guide rails for supplying said motor with power, a guard for preventing said cables from contacting with said trolley, and means for supporting a trial craft from and beneath said captive craft.

12. An apparatus of the character described comprising a guide rail, a traveling block supported by said guide rail, an electric air craft, guy cables running from said craft to said block, a trolley wire supported by said guide rail, a trolley carried by said block, a power cable connecting the trolley with the air craft, means for controlling the elevation of said air craft, and means for supporting a trial craft from and beneath said captive craft.

13. An apparatus of the character described comprising a guide rail having a plurality of holes therein, a traveling block supported by said rail, a captive air craft, a guy cable running from said air craft to said block, a trolley wire looped into said holes, a trolley carried by the traveling block, a power cable running from the trolley to said air craft, and means for supporting a trial craft from and beneath said captive craft.

14. An apparatus of the character described comprising a captive air craft, a car holding the same captive, said car being adapted to be moved by said craft, means on said car for controlling said craft, and means for supporting a trial craft from and beneath said captive craft.

15. An apparatus of the character described comprising a captive power air craft, a car holding the same captive, said car being adapted to be moved by said craft, means on said car for controlling said craft, and means for supporting a trial craft from and beneath said captive craft.

16. An apparatus of the character described comprising a captive air craft, a fixed track, a car traveling on said track for holding said craft captive, means on said car for controlling said craft, a second track to which said craft is guyed, and means for supporting a trial craft from and beneath said captive craft.

17. An apparatus of the character described comprising a captive air craft, a car holding the same captive, said car being adapted to be moved by the craft, means on said car for controlling the height of said craft, and means supporting a trial craft from and beneath said captive craft.

18. An apparatus of the character described comprising a captive power air craft, a car holding the same captive, said car being adapted to be moved by said craft, means on said car for controlling the speed of said air craft, and means for supporting a trial craft from and beneath said captive craft.

19. An apparatus of the character described comprising a captive air craft, a car holding the same captive, said car being adapted to be moved by said craft, a brake on said car for controlling said craft, and means for supporting a trial craft from and beneath said captive craft.

20. An apparatus of the character described comprising an electric air craft, a car holding the same captive, said car being adapted to be moved by said craft, an electric controller on said car for controlling the speed of said craft, and means for supporting a trial craft from and beneath said captive craft.

21. In an apparatus of the character described, a captive air craft, a car for holding said craft captive, a frame rest on said car for directly supporting the captive craft when it is lowered to the earth, and means for supporting a trial craft from and beneath the captive craft.

22. In an apparatus of the character described, a captive air craft, a car for holding the same captive, means on said car for directly supporting the captive craft when it is lowered to the earth, skids attached to said car for loading said captive craft, and means for supporting a trial craft from and beneath said captive craft.

23. In an apparatus of the character described, a pair of spaced guide rails, traveling blocks supported by said guide rails, a surface track between the guide rails, a controlling car on the track, a captive air craft above the guide rails, cables running from the air craft to the traveling blocks and to the controlling car, and means for supporting a trial craft from and beneath the said captive craft.

24. In an apparatus of the character described, a pair of spaced guide rails, traveling blocks supported by said guide rails, a surface track between the guide rails, a controlling car on the track, a captive air craft above the guide rails, cables from the air craft to the traveling blocks and to the controlling car, a coupling in the cables on the car side of the traveling blocks whereby the cables may be released from said car and the air craft may be held captive by said traveling blocks, and means for supporting a trial craft from and beneath said captive craft.

25. In an apparatus for testing heavier-than-air craft, a power propelled captive air craft, means for controlling the height of the same above the ground, and vertical supports for carrying a trial air craft beneath the same, the supports being loosely connected to the trial craft and having means at their lower ends for holding the supports taut during the rise of the trial craft.

26. In an apparatus for testing heavier-than-air craft, a captive craft, flexible supports depending from the captive craft and having weights upon their lower ends to hold the supports taut, a trial craft mounted for vertical sliding movement upon the flexible supports and being limited from downward movement from the supports by said weights, and means connected to the captive craft for admitting traveling of the same in a given path with the trial craft.

In testimony whereof I have hereunto set my hand in presence of two subscribing witnesses.

FREDERICK BRACKETT.

Witnesses:
ARTHUR L. BRYANT,
GEO. W. REA.